(12) United States Patent
Li et al.

(10) Patent No.: US 11,085,295 B2
(45) Date of Patent: Aug. 10, 2021

(54) TUNNEL BORING ROBOT AND REMOTE MOBILE TERMINAL COMMAND SYSTEM

(71) Applicants: HUANENG TIBET YARLUNGZANGBO RIVER HYDROPOWER DEVELOPMENT INVESTMENT CO., LTD., Sichuan (CN); TSINGHUA UNIVERSITY, Beijing (CN); HUANENG GROUP TECHNOLOGY INNOVATION CENTER CO., LTD., Beijing (CN)

(72) Inventors: Qingbin Li, Beijing (CN); Chaoyi Li, Sichuan (CN); Qinglong Zhang, Beijing (CN); Pengxiang Qin, Sichuan (CN); Xiaoli Liu, Beijing (CN); Qianjun Xu, Beijing (CN)

(73) Assignees: HUANENG TIBET YARLUNGZANGBO RIVER HYDROPOWER DEVELOPMENT INVESTMENT CO., LTD., Sichuan (CN); TSINGHUA UNIVERSITY, Beijing (CN); HUANENG GROUP TECHNOLOGY INNOVATION CENTER CO., LTD., Beijing (CN)

(*) Notice: Subject to any disclaimer, the term of this patent is extended or adjusted under 35 U.S.C. 154(b) by 0 days.

(21) Appl. No.: 16/697,961

(22) Filed: Nov. 27, 2019

(65) Prior Publication Data
US 2020/0240268 A1   Jul. 30, 2020

(30) Foreign Application Priority Data

Jan. 24, 2019 (CN) .......................... 201910068376.9
Jan. 24, 2019 (CN) .......................... 201920124915.1

(51) Int. Cl.
E21D 9/10 (2006.01)
E21D 9/00 (2006.01)
(Continued)

(52) U.S. Cl.
CPC .............. *E21D 9/003* (2013.01); *E21D 9/108* (2013.01); *E21C 35/24* (2013.01); *G01V 99/005* (2013.01)

(58) Field of Classification Search
CPC ......... E21D 9/003; E21D 9/004; E21D 9/093; E21D 9/108; E21C 35/24; G01V 99/005
(Continued)

(56) References Cited

U.S. PATENT DOCUMENTS

5,310,249 A * 5/1994 Sugden ................. E21D 9/1013
299/1.3
5,501,548 A * 3/1996 Hayashi ................. E21D 9/093
405/143
(Continued)

*Primary Examiner* — Janine M Kreck
*Assistant Examiner* — Michael A Goodwin
(74) *Attorney, Agent, or Firm* — Hodgson Russ LLP (57) ABSTRACT

A tunnel boring robot includes a tunnel boring machine, a sensing unit, an intelligent decision unit, and a controller unit. The sensing unit, the intelligent decision unit and the controller unit are disposed at the tunnel boring machine. The sensing unit is configured to sense, in real time, boring operation data of a current cycle during which the tunnel boring machine is working according to set boring parameter information. The intelligent decision unit is configured to receive the boring operation data sent by the sensing unit, and generate the set boring parameter information for a next cycle according to a preset prediction algorithm, the boring operation data and a desired boring effect. The controller unit is configured to receive the set boring parameter information, and control the tunnel boring machine to perform a boring operation for the next cycle according to the set boring parameter information.

17 Claims, 4 Drawing Sheets

(51) Int. Cl.
*G01V 99/00* (2009.01)
*E21C 35/24* (2006.01)

(58) Field of Classification Search
USPC .................................................. 299/1.3, 1.8
See application file for complete search history.

(56) References Cited

U.S. PATENT DOCUMENTS

| | | | | |
|---|---|---|---|---|
| 6,772,134 | B1* | 8/2004 | Jacubasch | E21B 44/00 706/8 |
| 2009/0297273 | A1* | 12/2009 | Lindbergh | E21D 9/003 405/138 |
| 2011/0248548 | A1* | 10/2011 | Junker | E21C 35/24 299/1.6 |
| 2017/0218757 | A1* | 8/2017 | Li | G01V 1/04 |
| 2019/0017380 | A1* | 1/2019 | Wang | E21D 9/087 |

* cited by examiner

TUNNEL BORING ROBOT AND REMOTE MOBILE TERMINAL COMMAND SYSTEM

CROSS-REFERENCE TO RELATED APPLICATION

This application claims priority to Chinese Patent Application Nos. 201910068376.9 and 201920124915.1, each filed on Jan. 24, 2019, the entire disclosures of which are incorporated herein by reference.

FIELD

The present disclosure relates to the field of boring, and more particularly to a tunnel boring robot and a remote mobile terminal command system.

BACKGROUND

During tunnel construction, problems such as fault zone, fracture zone, high geostress, rock burst and water inflow may occur due to complex and unfavorable geological conditions, and these problems are generally addressed according to experience of a skilled person in the art. In the existing relevant operation method, the skilled one guesses wall rock state parameters based on experience and continues to operate with the parameters until a suitable one is determined. However, these experimental operations cost time and energy, and cutters, a cutterhead or other components of a tunnel boring machine may be damaged abnormally. If the tunnel boring machine is controlled by personal experience, this may cause an unsatisfied quality of the tunnel construction or even cause major construction accidents.

SUMMARY

Embodiments of the present disclosure seek to solve at least one of the problems existing in the related art to at least some extent.

An object of the present disclosure is to provide a tunnel boring robot. Another object of the present disclosure is to provide a remote mobile terminal command system.

In order to achieve the above objects, in an aspect, the present disclosure provides in embodiments a tunnel boring robot, including: a tunnel boring machine, a sensing unit, an intelligent decision unit connected to the sensing unit, and a controller unit connected to the intelligent decision unit. The sensing unit, the intelligent decision unit and the controller unit are disposed at the tunnel boring machine. The sensing unit is configured to sense, in real time, boring operation data of a current cycle during which the tunnel boring machine is working according to set boring parameter information. The boring operation data includes tunnel wall rock state information, tunnel geological forecasting information, fine exploration information, precision lining information, a real-time boring effect information indicator and real-time boring parameter information. The intelligent decision unit is configured to receive the boring operation data sent by the sensing unit, and generate the set boring parameter information for a next cycle according to a preset prediction algorithm, the boring operation data and a desired boring effect. The controller unit is configured to receive the set boring parameter information, and control the tunnel boring machine to perform a boring operation for the next cycle according to the set boring parameter information.

In an embodiment of the present disclosure, the wall rock state information includes a uniaxial saturated compressive strength of rock $R_c(x, y, z)$, a joint number of unit volume of rock $J_v(x, y, z)$ and a wall rock grade $W(x, y, z)$, and the boring parameter information includes a single-cutter thrust force $F_t(x, y, z)$, a single-cutter torque $T_n(x, y, z)$, a cutterhead rotational speed $N(x, y, z)$, a boring velocity $V(x, y, z)$ and a boring direction $D(x, y, z)$.

In an embodiment of the present disclosure, the sensing unit includes: an ahead geological detection subunit configured to perform a detection by a horizontal ultra-long boring technological means to acquire the tunnel geological forecasting information.

In an embodiment of the present disclosure, the preset prediction algorithm includes a boring parameter prediction algorithm based on a neural network structure; and the intelligent decision unit is further configured to generate the boring parameter prediction algorithm through training historical boring operation data.

In an embodiment of the present disclosure, the controller unit includes: an electrical sub-controller unit including a plurality of programmable logic controller units (PLCs), the PLCs being communicated with each other through a network communication interface where the electrical sub-controller unit is configured to control, respectively by the plurality of PLCs, a plurality of boring devices in the tunnel boring machine to perform a boring action according to the set boring parameter information.

In an embodiment of the present disclosure, the electrical sub-controller unit includes an A/D conversion function module, a PLC control program module, and a D/A conversion function module. The A/D conversion function module and the D/A conversion function module are both communicated with the PLC control program module. When the set boring parameter information includes single-cutter thrust force, the A/D conversion function module is configured to output, according to a voltage value corresponding to the single-cutter thrust force, a target thrust force value corresponding to the voltage value; the PLC control program module is configured to acquire a current thrust force value according to a digital value and a thrust force position of an operation board, calculate a thrust force difference between the target thrust force value and the current thrust force value, and acquire a thrust force control digital value according to a preset algorithm and the thrust force difference; the D/A conversion function module is configured to convert the thrust force control digital value into a thrust force control analog value; the controller unit is specifically configured to control a hydraulic servo system and a hydraulic proportional valve that provide thrust force to the operation board according to the thrust control analog value, such that a thrust force of a single-cutter of the operation board reaches the target thrust force value.

In an embodiment of the present disclosure, the sensing unit is specifically configured to: collect N relative errors between boring direction design data and an actual boring direction measurement data of a guiding system of the tunnel boring machine with a first preset collection frequency in the current cycle, and calculate a first error average of the N relative errors, where N is any integer greater than 1; collect N groups of the set boring parameter information and the real-time boring parameter information of the tunnel boring machine in the current cycle with a second preset collection frequency, and calculate a relative error for each parameter in each group of the set boring parameter information and the real-time boring parameter information, so as to acquire a set of errors; calculate a second error average for each parameter with the N relative errors corresponding to the parameter in the set of errors; perform a numerical average operation on the first error average value and the second error average value to obtain an average value $\overline{RE}$, and acquire the real-time boring effect information indicator according to the following formula, $$A(x,y,z)=100\times(1-\overline{RE})$$

where A(x, y, z) represents the real-time boring effect information indicator.

In an embodiment of the present disclosure, the intelligent decision unit is further configured to determine a boring mode according to the fine exploration information, and send the boring mode to the controller unit, such that the controller unit controls the tunnel boring machine to perform boring operation according to the boring mode; the intelligent decision unit is further configured to generate disaster warning information according to the tunnel geological forecasting information, such that the tunnel boring machine adopts a disaster avoiding action according to the disaster warning information.

In order to achieve the above objects, in another aspect, the present disclosure provides in embodiments a remote mobile terminal command system, including a tunnel boring robot as defined in the embodiments of the above aspect and a command apparatus. The tunnel boring robot is communicated with the command apparatus. The command apparatus includes a mobile terminal and a cloud service unit. The cloud service unit is configured to: monitor a tunnel construction site in real time, storage, analyze, display, playback and manage boring operation data of the tunnel construction site transmitted by wireless, support a man-machine interaction through the command system and the tunnel boring machine so as to realize a boring mode of remotely controlling the tunnel boring machine to work, update a decision model of the intelligent decision unit, provide an operation plan of the command apparatus to the intelligent decision unit, and provide a real-time support to the intelligent decision unit. The mobile terminal is configured to: allow a self-developed command system application to be loaded to access the cloud service unit of a cloud server in real time for man-machine interaction, remotely control the tunnel boring machine, and remotely monitor the tunnel construction site in real time.

In an embodiment of the present disclosure, the mobile terminal is further configured to receive a boring operation instruction, and send the boring operation instruction to the tunnel boring robot to control the tunnel boring robot to perform a boring operation according to the boring operation instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A tunnel boring robot and a remote mobile terminal command system provided in embodiments of the present disclosure will be described below with reference to the accompanying drawings.

Figure 1:
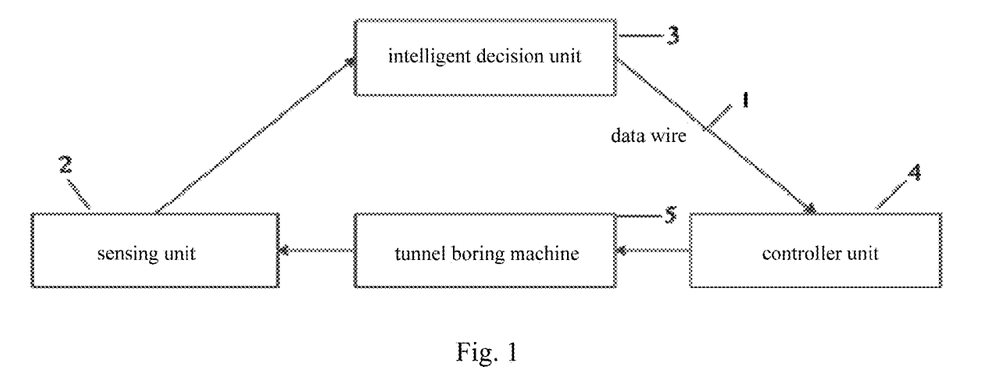
FIG. 1 is a schematic diagram showing a tunnel boring robot according to an embodiment of the present disclosure.

FIG. 1 is a schematic diagram showing a tunnel boring robot according to an embodiment of the present disclosure. As shown in FIG. 1, the tunnel boring robot includes: a data wire 1, a sensing unit 2, an intelligent decision unit 3, a controller unit 4 and a tunnel boring machine 5. Specifically, the tunnel boring machine 5 is the body of the tunnel boring robot, and the sensing unit 2, the intelligent decision unit 3 and the controller unit 4 are disposed at the tunnel boring machine 5.

Specifically, the sensing unit 2 is configured to sense, in real time, boring operation data of a current cycle during which the tunnel boring machine is working according to set boring parameter information. The boring operation data includes tunnel wall rock state information, tunnel geological forecasting information, fine exploration information, precision lining information, a real-time boring effect information indicator and real-time boring parameter information.

The intelligent decision unit 3 is configured to receive the boring operation data sent by the sensing unit, and generate the set boring parameter information for a next cycle according to a preset prediction algorithm, the boring operation data and a desired boring effect.

The controller unit 4 is configured to receive the set boring parameter information, and control the tunnel boring machine to perform a boring operation for the next cycle according to the set boring parameter information.

In an embodiment of the present disclosure, the tunnel boring robot may be used in combination with a cloud service unit.

Specifically, the present disclosure provides in embodiments a tunnel boring robot (TBR). The sensing unit 2 is used to acquire the tunnel wall rock state information, the boring parameter information, the geological forecasting information, the boring effect information, the fine exploration information and the precision lining information in real time during the boring operation and send the information to the cloud service unit in real time. The intelligent decision unit 3 is used to analyze the sensed data, evaluate the boring effect, make a real-time boring decision by the machine itself and send the decision to the cloud service unit in real time. The controller unit 4 is used to adjust boring operation and operation state according to the decision information and send the information to the cloud service unit. The tunnel boring machine 5 performs the boring operation and continuously transmits the boring operation data back to the sensing unit 2. A remote mobile terminal command system 6 is built on the basis of the robot and the cloud service unit, and is configured to monitor the construction site in real time, realize the remote human-machine interaction, and send the operation plan to the intelligent decision unit 3 via the cloud service unit.

Specifically, the tunnel boring machine is the body of the tunnel boring robot.

The sensing unit is configured to acquire the tunnel wall rock state information, the boring parameter information, the geological forecasting information, the boring effect information, the fine exploration information and the precision lining information in real time during the boring operation and send the information to the cloud service unit in real time.

The intelligent decision unit is configured to receive the tunnel wall rock state information, tunnel geological forecasting information, fine exploration information, precision lining information, the boring effect information and the boring parameter information sent by the sensing unit, produce a boring parameter prediction algorithm by training the data acquired by the sensing unit, acquire optimal boring parameter information for a next cycle according to the prediction algorithm, and send the decision information to the cloud service unit in real time.

The controller unit is configured to adjust the boring operation and the operation state according to the decision information, i.e., the optimal boring parameters, drive the tunnel boring machine to perform a corresponding action and send the state information to the cloud service unit. The sensing unit collects data of the boring effect generated according to the current control parameters, and the boring effect and the control parameters together form new training data to update the intelligent decision model, thus forming an operation cycle, i.e., a closed loop of operation and update.

In an embodiment of the present disclosure, the wall rock state information includes a uniaxial saturated compressive strength of rock $R_c(x, y, z)$, a joint number of unit volume of rock $J_v(x, y, z)$ and a wall rock grade $W(x, y, z)$. The boring parameter information includes a single-cutter thrust force $F_t(x, y, z)$, a single-cutter torque $T_n(x, y, z)$, a cutterhead rotational speed $N(x, y, z)$, a boring velocity $V(x, y, z)$ and a boring direction $D(x, y, z)$.

In an embodiment of the present disclosure, the sensing unit includes an ahead geological detection subunit configured to perform a detection by a horizontal ultra-long boring technological means to acquire the tunnel geological forecasting information.

Specifically, the sensed information acquired by the sensing unit includes the tunnel wall rock state information, the geological forecasting information, the boring parameter information, the boring effect information, the fine exploration information and the precision lining information. The sensed information is sent to the cloud service unit in real time. The geological forecasting information is detected by an ahead geological detection system with the horizontal ultra-long boring technological means having advantages of a long detection distance and an effective detection of unfavorable geological features such as fault zones and fracture zones, and thus detection data Forcasting(x, y, z) is acquired, so as to provide early warning and forecast for problems such as rock burst, tunnel boring machine being trapped and water inflows. A direct control can be realized by the long-distance horizontal boring technology. The boring effect information includes boring direction design data DirectionDesign(x, y, z) which is pre-designed, actual boring direction measurement data DirectionMeasurement (x, y, z) which is measured by a boring guidance system of the tunnel boring machine, and actual measurement data of boring parameters, such as a single-cutter thrust force $F_t(x, y, z)$, a single-cutter torque $T_n(x, y, z)$, a cutterhead rotational speed $N(x, y, z)$, a boring velocity $V(x, y, z)$ and a real-time boring effect information indicator $A(x, y, z)$ which is acquired according to above data. The fine exploration information FineExploration(x, y, z) includes information such as geostress, rock strength, geological structure and osmotic pressure distribution, which is acquired by the horizontal ultra-long boring technological means. Based on this information, a precise three-dimensional geological model is established to support the acquisition of the wall rock state information and the boring effect information. The precision lining information PrecisionLining(x, y, z) is provided by a precision lining intelligent operation system, and includes intelligent assessment information of local collapse risk, intelligent support decision information of collapse, and bottom slag cleaning information.

The wall rock state information includes a uniaxial saturated compressive strength of rock, a joint number of unit volume of rock and a wall rock grade. A core of the wall rock located around the construction region is sampled and a wall rock joint diagram is drawn. The core of the wall rock is tested in a lab to calculate the uniaxial saturated compressive strength of rock $R_c(x, y, z)$, and the joint number of unit volume of rock $J_v(x, y, z)$ is acquired according to the wall rock joint diagram of a position where the core is located or is close to and the engineering rock grading standard. During a process of transforming the joint number of unit volume of rock $J_v(x, y, z)$ into a completeness index value $K_v(x, y, z)$, a sequential wall rock grade $W(x, y, z)$ is calculated by a fitting and interpolation method. The boring parameter information includes the single-cutter thrust force $F_t(x, y, z)$, the single-cutter torque $T_n(x, y, z)$, the cutterhead rotational speed $N(x, y, z)$, the boring velocity $V(x, y, z)$ and the boring direction $D(x, y, z)$. Specifically, the single-cutter thrust force, the single-cutter torque, the cutterhead rotational speed, the boring velocity and the boring direction are collected in real time by the sensing unit which is disposed at the tunnel boring machine. The boring effect information includes the boring direction design data DirectionDesign(x, y, z) which is pre-designed, the actual boring direction measurement data DirectionMeasurement(x, y, z) which is measured by a boring guidance system of the tunnel boring machine, and actual measurement data of boring parameters, such as the single-cutter thrust force $F_t(x, y, z)$, the single-cutter torque $T_n(x, y, z)$, the cutterhead rotational speed $N(x, y, z)$, the boring velocity $V(x, y, z)$ and the real-time boring effect information indicator $A(x, y, z)$ which is acquired according to above data.

In an embodiment of the present disclosure, the preset prediction algorithm includes a boring parameter prediction algorithm based on a neural network structure. The intelligent decision unit is further configured to generate the boring parameter prediction algorithm through training historical boring operation data.

Figure 2:
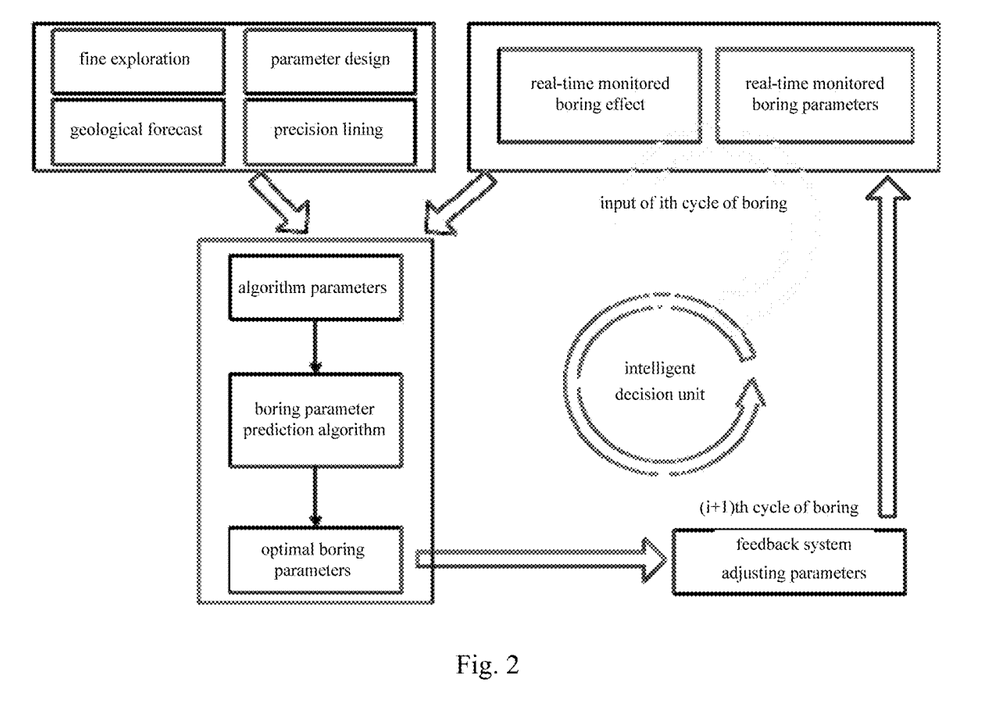
FIG. 2 is a schematic diagram showing an intelligent decision system according to an embodiment of the present disclosure.

As shown in FIG. 2, the intelligent decision unit 3 realizes intelligent decision-making in such a manner that a boring operation is performed in cycle to automatically adjust the boring parameters of the tunnel boring machine, realize multi-level joint control and multi-system cooperation for unmanned boring operations.

The boring parameter prediction algorithm is based on the neural network algorithm and is used to determine a boring mode of the tunnel boring machine with the fine exploration information FineExploration(x, y, z) acquired by the sensing unit. The geological forecasting information Forecasting(x, y, z) acquired by the sensing unit is used to provide early warning and forecast for problems such as rock burst and water inflows, and take corresponding control measures according to the problem situations. The wall rock state information and the precise lining information acquired by the sensing unit, and the boring operation data sent from the tunnel boring machine, i.e., the real-time boring effect information and the boring parameter information, are used to predict the boring parameters to be used in a next cycle, such that an efficient boring operation can be realized in a determined boring mode without problems during the construction process, and a next construction cycle will be formed with the precision lining intelligent operation system.

The boring parameter prediction algorithm may be updated by periodically training real-time historical experience data, and the current sensed information may be used to predict the boring parameters of the next cycle in real time. The current sensed information is the training data to periodically update the algorithm, and includes the uniaxial saturated compressive strength of rock $R_c(x, y, z)$, the joint number of unit volume of rock $J_v(x, y, z)$, the wall rock grade $W(x, y, z)$, the single-cutter thrust force $F_t(x, y, z)$, the single-cutter torque $T_n(x, y, z)$, the cutterhead rotational speed $N(x, y, z)$, the boring velocity $V(x, y, z)$, the boring direction $D(x, y, z)$ and the boring effect information indicator $A(x, y, z)$. The boring parameters of the next boring cycle are the target parameters to be predicted by the prediction algorithm of the decision system, which directly determines the boring parameters of the next boring cycle and the action of the precision lining intelligent operating system.

A boring cycle includes a boring period and a replacement reset period. Specifically, a replacement reset refers to a process after one stroke is finished in which rear support legs of the tunnel boring machine extend to support the machine so as to replace the support from propel cylinders and horizontal support cylinders, that is, at this time, the propel cylinders and the horizontal support cylinders are reset to their original positions, thus realizing working stages of support, propulsion and replacement for the tunnel boring robot.

Further, a boring cycle may be divided into 10 periods during each the sensing unit performs a sensing measurement.

Figure 3:
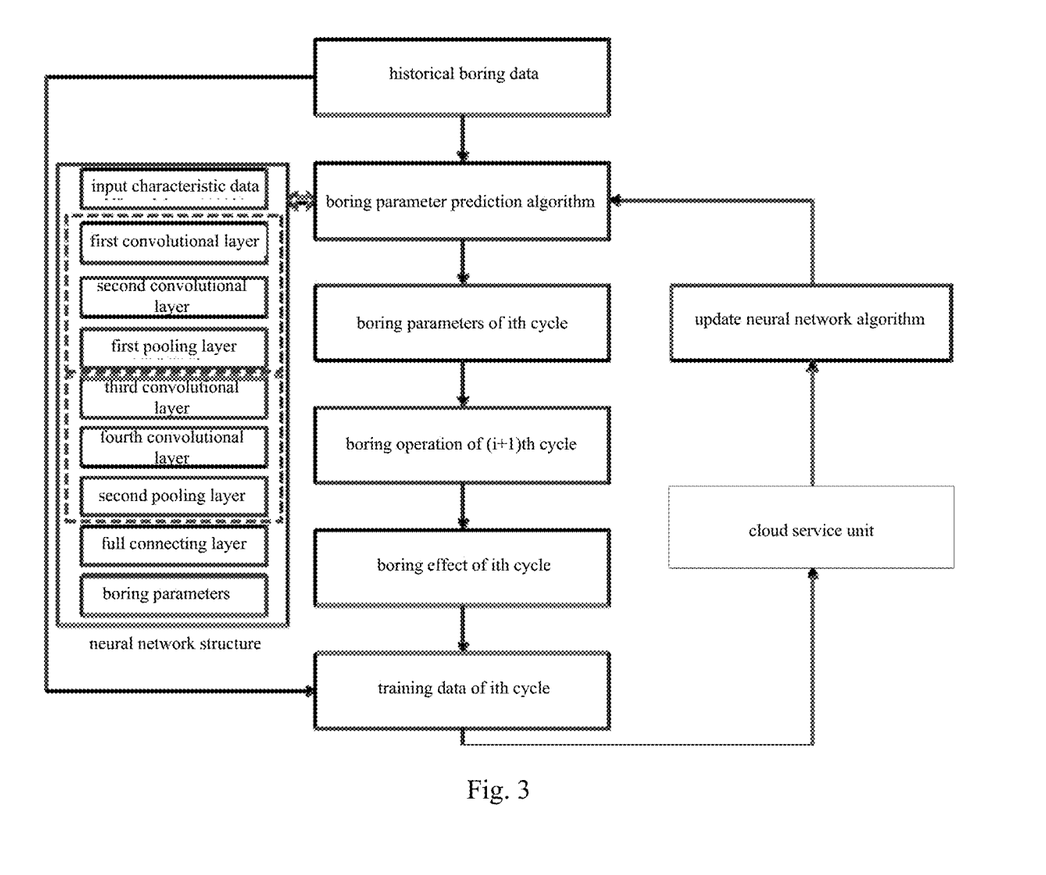
FIG. 3 is a flow chart of updating an intelligent decision model according to an embodiment of the present disclosure.

As shown in FIG. 3, the boring parameter prediction algorithm may predict the boring parameters in real time. The relevant boring operation data such as the tunnel wall rock state information, the tunnel geological forecasting information, the fine exploration information, the precision lining information, the boring effect information and the boring parameter information may be acquired by the sensing unit and calculated by the prediction algorithm PredictionModel(X) to acquire data of the boring parameters for the nest cycle. A prediction formula is as follows.

$F_t^i(x,y,z), T_n^i(x,y,z), N^i(x,y,z), V^i(x,y,z), D^i(x,y,z)$=PredictionModel($X_i(x,y,z)$)

The cloud service unit provides support for the periodic update of the boring parameter prediction algorithm. For example, a neural network algorithm having a convolutional neural network structure is used. For the training model with such a structure, the input data includes spatial three-dimensional coordinates (x, y, z), data, before the boring, of a uniaxial saturated compressive strength of rock $R_c^{i-1}(x, y, z)$, a joint number of unit volume of rock $J_v^{i-1}(x, y, z)$, a wall rock grade $W^{i-1}(x, y, z)$, a single-cutter thrust force $F_t^{i-1}(x, y, z)$, a single-cutter torque $T_n^{i-1}(x, y, z)$, a cutterhead rotational speed $N^{i-1}(x, y, z)$, a boring velocity $V^{i-1}(x, y, z)$ and a boring effect indicator $A^{i-1}(x, y, z)$, and data, after the boring, of a uniaxial saturated compressive strength of rock $R_i^c(x, y, z)$, a joint number of unit volume of rock $J_v^i(x, y, z)$, a wall rock grade $W^i(x, y, z)$, a single-cutter thrust force $F_t^i(x, y, z)$, a single-cutter torque $T(x, y, z)$, a cutterhead rotational speed $N^i(x, y, z)$, a boring velocity $V^i(x, y, z)$, a boring direction $D^i(x, y, z)$ and a boring effect indicator $A^i(x, y, z)$, and an output target is boring parameters, i.e., a single-cutter thrust force $F_t(x, y, z)$, a single-cutter torque $T_n(x, y, z)$, a cutterhead rotational speed $N(x, y, z)$, a boring velocity $V(x, y, z)$ and a boring direction $D(x, y, z)$ of the tunnel boring machine. Considering that the boring operation effect is gradually accumulated to reach the desired boring effect, the boring effect data of a plurality of cycles of the boring for the same position in a tunnel or an underground passage should have relevance, characteristic data of 5 latest boring cycles may be selected to form a characteristic matrix. The update of the prediction algorithm will be performed when 210 training sample matrices are accumulated, and then the updated prediction algorithm is synchronized with the intelligent decision unit of the tunnel boring robot.

Data characteristics of the $i^{th}$ boring cycle in the spatial three-dimensional coordinates (x, y, z) are as follows.

$$x_n(x, y, z) = \begin{bmatrix} x \\ y \\ z \\ R_c^i(x, y, z) \\ R_c^{i-1}(x, y, z) \\ J_v^{i-1}(x, y, z) \\ J_v^i(x, y, z) \\ W^{i-1}(x, y, z) \\ W^i(x, y, z) \\ F_t^{i-1}(x, y, z) \\ F_t^i(x, y, z) \\ T_n^{i-1}(x, y, z) \\ T_n^i(x, y, z) \\ D^{i-1}(x, y, z) \\ D^i(x, y, z) \\ N^{i-1}(x, y, z) \\ N^i(x, y, z) \\ V^{i-1}(x, y, z) \\ V^i(x, y, z) \\ A^{i-1}(x, y, z) \\ A^i(x, y, z) \end{bmatrix}$$

The input data for training the prediction algorithm is as follows.

$X_i(x,y,z) = [x_i, x_{i-1}, x_{i-2}, x_{i-3}, x_{i-4}]$ $X_i(x, y, z)$ is a 21*5 two-dimensional matrix, constituting the latest boring historical characteristic data in the same region. The boring parameter data of the $i^{th}$ boring cycle in the spatial three-dimensional coordinates (x, y, z) is as follows.

$$Y_i(x, y, z) = \begin{bmatrix} F_t^i \\ T_n^i \\ N^i \\ V^i \\ D^i \end{bmatrix}$$

The neural network structure of the intelligent decision model is shown as FIG. 3. This model is based on the convolutional neural network structure, which includes a plurality of convolutional layers, a plurality of pooling layers, and a full connecting layer, so as to realize the intelligent prediction on the boring parameters.

With reference to FIG. 3, the training process of the boring parameter prediction algorithm is further described. After the $n^{th}$ boring cycle of the boring operation is performed in the region of the spatial three-dimensional coordinates (x, y, z), characteristic data $x_i(x, y, z)$ of this process is acquired, and in combination of historical data of 5 latest boring cycles, a sample training data is as follows.

$$X_i(x, y, z) = \begin{bmatrix}
x & x & x & x & x \\
y & y & y & y & y \\
z & z & z & z & z \\
R_c^i(x, y, z) & R_c^{i-1}(x, y, z) & R_c^{i-2}(x, y, z) & R_c^{i-3}(x, y, z) & R_c^{i-4}(x, y, z) \\
R_c^{i-1}(x, y, z) & R_c^{i-2}(x, y, z) & R_c^{i-3}(x, y, z) & R_c^{i-4}(x, y, z) & R_c^{i-5}(x, y, z) \\
J_v^i(x, y, z) & J_v^{i-1}(x, y, z) & J_v^{i-2}(x, y, z) & J_v^{i-3}(x, y, z) & J_v^{i-4}(x, y, z) \\
J_v^{i-1}(x, y, z) & J_v^{i-2}(x, y, z) & J_v^{i-3}(x, y, z) & J_v^{i-4}(x, y, z) & J_v^{i-5}(x, y, z) \\
W^i(x, y, z) & W^{i-1}(x, y, z) & W^{i-2}(x, y, z) & W^{i-3}(x, y, z) & W^{i-4}(x, y, z) \\
W^{i-1}(x, y, z) & W^{i-2}(x, y, z) & W^{i-3}(x, y, z) & W^{i-4}(x, y, z) & W^{i-5}(x, y, z) \\
F_t^i(x, y, z) & F_t^{i-1}(x, y, z) & F_t^{i-2}(x, y, z) & F_t^{i-3}(x, y, z) & F_t^{i-4}(x, y, z) \\
F_t^{i-1}(x, y, z) & F_t^{i-2}(x, y, z) & F_t^{i-3}(x, y, z) & F_t^{i-4}(x, y, z) & F_t^{i-5}(x, y, z) \\
T_n^i(x, y, z) & T_n^{i-1}(x, y, z) & T_n^{i-2}(x, y, z) & T_n^{i-3}(x, y, z) & T_n^{i-4}(x, y, z) \\
T_n^{i-1}(x, y, z) & T_n^{i-2}(x, y, z) & T_n^{i-3}(x, y, z) & T_n^{i-4}(x, y, z) & T_n^{i-5}(x, y, z) \\
D^i(x, y, z) & D^{i-1}(x, y, z) & D^{i-2}(x, y, z) & D^{i-3}(x, y, z) & D^{i-4}(x, y, z) \\
D^{i-1}(x, y, z) & D^{i-2}(x, y, z) & D^{i-3}(x, y, z) & D^{i-4}(x, y, z) & D^{i-5}(x, y, z) \\
N^i(x, y, z) & N^{i-1}(x, y, z) & N^{i-2}(x, y, z) & N^{i-3}(x, y, z) & N^{i-4}(x, y, z) \\
N^{i-1}(x, y, z) & N^{i-2}(x, y, z) & N^{i-3}(x, y, z) & N^{i-4}(x, y, z) & N^{i-5}(x, y, z) \\
V^i(x, y, z) & V^{i-1}(x, y, z) & V^{i-2}(x, y, z) & V^{i-3}(x, y, z) & V^{i-4}(x, y, z) \\
V^{i-1}(x, y, z) & V^{i-2}(x, y, z) & V^{i-3}(x, y, z) & V^{i-4}(x, y, z) & V^{i-5}(x, y, z) \\
A^i(x, y, z) & A^{i-1}(x, y, z) & A^{i-2}(x, y, z) & A^{i-3}(x, y, z) & A^{i-4}(x, y, z) \\
A^{i-1}(x, y, z) & A^{i-2}(x, y, z) & A^{i-3}(x, y, z) & A^{i-4}(x, y, z) & A^{i-5}(x, y, z)
\end{bmatrix}_{21*5}$$

After the sample data is iterated by the neural network structure as shown in FIG. 3, weight parameter and paranoid parameter of each layer are acquired, from the training, as model data of the network structure, which is shown as follows.

$$K=[k_1,k_2,k_3,k_4,k_5], B=[b_1,b_2,b_3,b_4,b_5]$$

$k_n$ represents the weight parameter of the $n^{th}$ network layer, and $b_n$ represents the paranoid parameter of the $n^{th}$ network layer. These two parameters together constitute the boring parameter prediction algorithm.

In an embodiment of the present disclosure, the controller unit includes an electrical sub-controller unit including a plurality of programmable logic controller units (PLCs). The PLCs are communicated with each other through a network communication interface. The electrical sub-controller unit is configured to control, respectively by the plurality of PLCs, a plurality of boring devices in the tunnel boring machine to perform a boring action according to the set boring parameter information.

Specifically, the electrical sub-controller unit includes an A/D conversion function module, a PLC control program module, and a D/A conversion function module. The A/D conversion function module and the D/A conversion function module are both communicated with the PLC control program module. When the set boring parameter information includes single-cutter thrust force, the A/D conversion function module is configured to output, according to a voltage value corresponding to the single-cutter thrust force, a target thrust force value corresponding to the voltage value; the PLC control program module is configured to acquire a current thrust force value according to a digital value and a thrust force position of an operation board, calculate a thrust force difference between the target thrust force value and the current thrust force value, and acquire a thrust force control digital value according to a preset algorithm and the thrust force difference; the D/A conversion function module is configured to convert the thrust force control digital value into a thrust force control analog value; the controller unit is specifically configured to control a hydraulic servo system and a hydraulic proportional valve that provide thrust force to the operation board according to the thrust control analog value, such that a thrust force of a single-cutter of the operation board reaches the target thrust force value.

Figure 4:
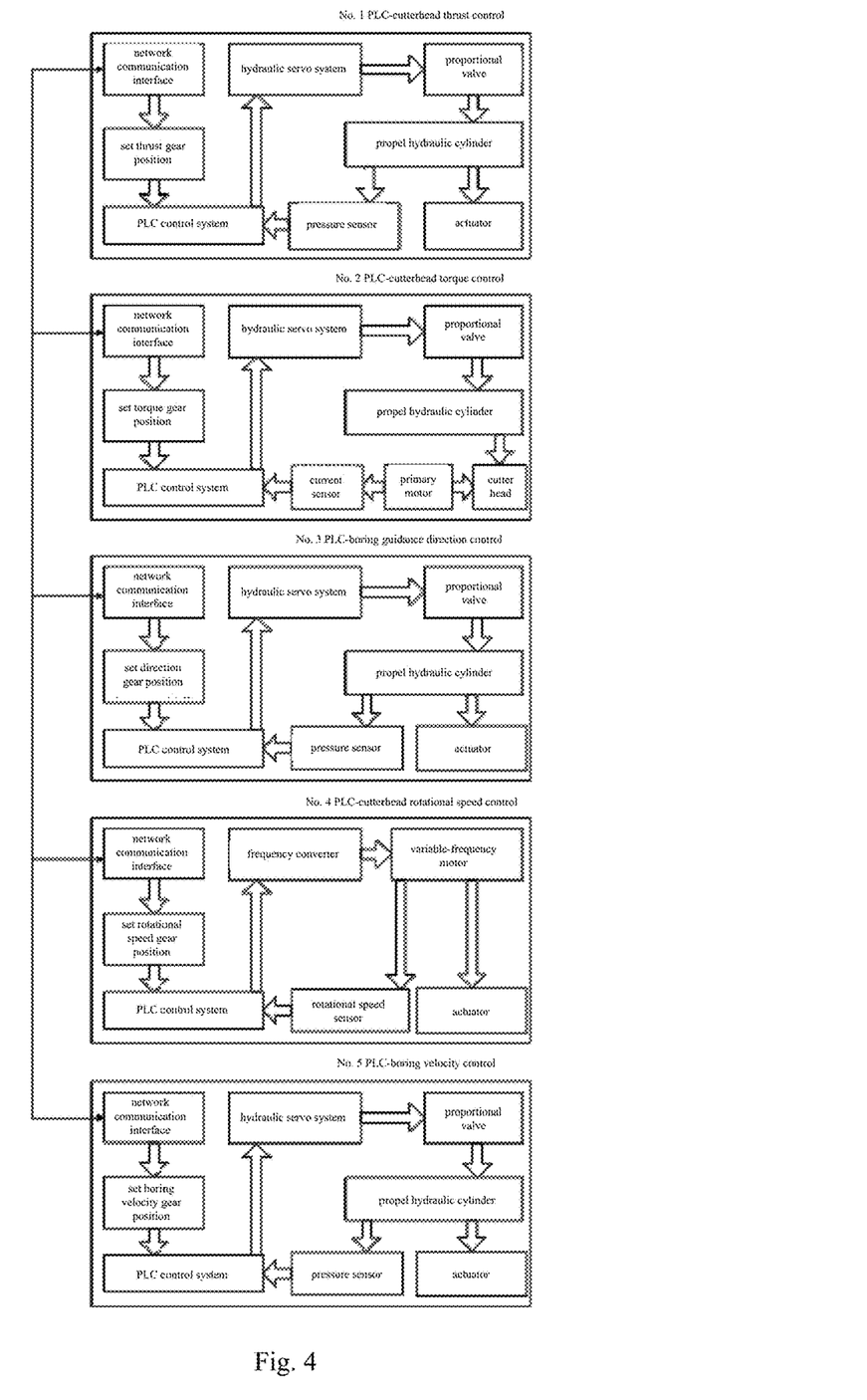
FIG. 4 is a schematic diagram showing a control system of a tunnel boring robot according to an embodiment of the present disclosure.

As shown in FIG. 4, the controller unit is used to realize the electrical control of the tunnel boring machine with a plurality of PLCs. The PLCs are communicated to each other through the network communication interface, so as to form an electrical control system of the tunnel boring machine. The PLC system automatically adjust and reset the cutterhead thrust force, the cutterhead torque, the boring direction, gear positions of the cutterhead rotational speed and the boring speed according to the optimal boring parameters provided by the intelligent decision unit, and thus the tunnel boring machine acts accordingly. While performing the operation, the machine continuously sends the boring operation data to the sensing unit in real time. For example, the automatic control of the cutterhead thrust force is described below.

A potentiometer for setting the thrust force gear position of the operation board is automatically reset and adjusted by the machine-related parameter provided by the intelligent decision unit. The parameter is a voltage value, and the voltage value is sent to the A/D conversion function module of the PLC system and converted into a digital value which represents a reference value of the cutterhead thrust. The PLC control program compares the set value of the cutterhead thrust force with the actual thrust force value detected by a pressure sensing unit to acquire a difference. A control digital value is acquired according to an automatic control algorithm and the thrust force difference. The control digital value is converted into an analog value by the D/A conversion function module. A hydraulic servo system and a hydraulic proportional valve are controlled to adjust a pressure of a hydraulic cylinder of the cutterhead, such that an actual thrust force of the cutterhead reaches the set value of the thrust force gear position of the cutterhead, thus realizing the automatic control of the cutterhead thrust force.

In an embodiment of the present disclosure, the intelligent decision unit is further configured to determine a boring mode according to the fine exploration information, and send the boring mode to the controller unit, such that the controller unit controls the tunnel boring machine to perform boring operation according to the boring mode. The intelligent decision unit is further configured to generate disaster warning information according to the tunnel geological forecasting information, such that the tunnel boring machine adopts a disaster avoiding action according to the disaster warning information.

The tunnel machine may be a full-profile hard rock tunnel boring machine applied for rock stratigraphic formation. The tunnel boring machine includes a main system and a supporting system, and is the body of the tunnel boring robot (TBR).

The tunnel boring machine may be operated in two modes, i.e., a double shield mode and a single shield mode. The double shield mode may be applied in a stable rock stratum. Gripper shoe cylinders extend from the tunnel boring machine and the gripper shoes press against the rock wall, such that the tunnel boring machine can be supported by friction between the gripper shoes and the rock wall. In the double shield mode, processes of tunnel boring, replacement reset, segment supporting, backfill grouting may be performed synchronously. The single shield mode is applied where the rock stratum is not stable enough to provide the support. In the single shield mode, auxiliary thrust cylinders acts on a surface of the segments to provide the support, and the boring and the replacement reset cannot be performed synchronously. During the assembly of the segments, auxiliary thrust cylinders also functions to compress the segments.

Further, the command system includes the tunnel boring machine, a cloud service unit and a mobile terminal. Specifically, the mobile terminal may be a smart phone, a tablet computer or a portable notebook computer, and is configured to allow a self-developed command system application to be loaded to access the cloud service unit of a cloud server in real time for man-machine interaction, remotely control the tunnel boring machine, remotely monitor the tunnel construction site in real time, and send an operation plan via the cloud service unit to the intelligent decision unit. On this basis, both the trained people at the construction site and skilled people at a distance can use the command system to control the tunnel boring robot.

In the command system, the cloud service unit is configured to monitor a tunnel construction site in real time, storage, analyze, display, playback and manage boring operation data of the tunnel construction site transmitted by wireless, support a man-machine interaction through the command system and the tunnel boring machine so as to realize a boring mode of remotely controlling the tunnel boring machine to work, update a decision model of the intelligent decision unit, provide an operation plan of the command apparatus to the intelligent decision unit, and provide a real-time support to the intelligent decision unit.

In an embodiment of the present disclosure, the sensing unit is specifically configured to: collect N relative errors between boring direction design data and an actual boring direction measurement data of a guiding system of the tunnel boring machine with a first preset collection frequency in the current cycle, and calculate a first error average of the N relative errors, where N is any integer greater than 1; collect N groups of the set boring parameter information and the real-time boring parameter information of the tunnel boring machine in the current cycle with a second preset collection frequency, and calculate a relative error for each parameter in each group of the set boring parameter information and the real-time boring parameter information, so as to acquire a set of errors; calculate a second error average for each parameter with the N relative errors corresponding to the parameter in the set of errors; perform a numerical average operation on the first error average value and the second error average value to obtain an average value $\overline{RE}$, and acquire the real-time boring effect information indicator according to the following formula, $$A(x,y,z)=100\times(1-\overline{RE})$$

where A(x, y, z) represents the real-time boring effect information indicator.

Specifically, the boring effect indicator A(x, y, z) is determined according to the boring direction design data DirectionDesign(x, y, z) which is pre-designed, actual boring direction measurement data DirectionMeasurement(x, y, z) which is measured by a boring guidance system of the tunnel boring machine, and actual measurement data of boring parameters, such as the single-cutter thrust force F(x, y, z), the single-cutter torque T(x, y, z), the cutterhead rotational speed N(x, y, z), the boring velocity V(x, y, z). Specific steps are as follows.

In a first step, the relative error between the boring direction design data DirectionDesign(x, y, z) and the actual boring direction measurement data DirectionMeasurement (x, y, z) during a boring cycle is calculated. In the case that N is 10, 10 relative errors are collected and an average $\overline{RE}_{Direction}(x, y, z)$ of the 10 relative errors is calculated.

In a second step, the relative error between the set parameter value and the actual measured value detected by the sensing unit during a boring cycle is calculated, that is, 10 relative errors are collected, and average relative errors $\overline{RE}_{F_t}(x, y, z)$, $\overline{RE}_{T_n}(x, y, z)$, $\overline{RE}_N(x, y, z)$ and $\overline{RE}_V(x, y, z)$ are calculated.

In a third step, a numerical average operation is performed on the averages acquired from the first and second steps as $$\overline{RE} = \frac{\overline{RE}_{Direction}(x, y, z) + \overline{RE}_{F_t}(x, y, z) + \overline{RE}_{T_n}(x, y, z) + \overline{RE}_N(x, y, z) + \overline{RE}_V(x, y, z)}{5}.$$

In a fourth step, the boring effect indicator is calculated as $A(x, y, z) = 100 \times (1 - \overline{RE})$.

With the tunnel boring robot provided in embodiments of the present disclosure, an intelligent boring process may be realized, the boring process may be monitored on line and controlled according to the feedbacks, thus realizing unmanned operation or remote control for the tunnel boring machine. During the tunnel boring process, the working parameters of the tunnel boring machine are adaptively adjusted so as to ensure a real-time, intelligent, high-efficiency and high-quality boring process, improve quality and efficiency of boring construction for a tunnel and an underground passage, and realize the intelligent control of the tunnel boring machine used in the rock tunnel and the underground passage in applications such as water-power engineering, railway and highway traffic engineering, and the refined management of the construction.

In another aspect of the present disclosure, a remote mobile terminal command system is provided and is described with reference to the following drawing.

Figure 5:
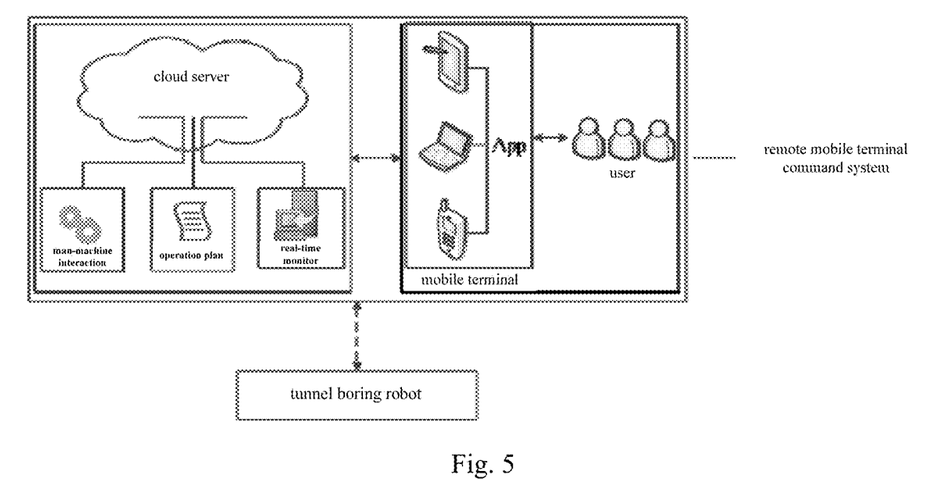
FIG. 5 is a schematic diagram showing a remote mobile terminal command system according to an embodiment of the present disclosure.

FIG. 5 is a schematic diagram showing a remote mobile terminal command system according to an embodiment of the present disclosure.

The system includes a tunnel boring robot and a command apparatus, where the tunnel boring robot is communicated with the command apparatus. Specifically, the command apparatus includes a mobile terminal and a cloud service unit.

The cloud service unit is configured to: monitor a tunnel construction site in real time, storage, analyze, display, playback and manage boring operation data of the tunnel construction site transmitted by wireless, support a man-machine interaction through the command system and the tunnel boring machine so as to realize a boring mode of remotely controlling the tunnel boring machine to work, update a decision model of the intelligent decision unit, provide an operation plan of the command apparatus to the intelligent decision unit, and provide a real-time support to the intelligent decision unit.

The mobile terminal is configured to: allow a self-developed command system application to be loaded to access the cloud service unit of a cloud server in real time for man-machine interaction, remotely control the tunnel boring machine, and remotely monitor the tunnel construction site in real time.

In an embodiment of the present disclosure, the mobile terminal is further configured to receive a boring operation instruction, and send the boring operation instruction to the tunnel boring robot to control the tunnel boring robot to perform a boring operation according to the boring operation instruction.

With the remote mobile terminal command system provided in embodiments of the present disclosure, the boring processes of various geological conditions, various construction modes and various construction stages may be monitored on line, and self-decision may be made as feedback to control and perform the boring process, so as to realize the unmanned operation or the remote control for the tunnel boring machine. The boring parameters may be controlled precisely to avoid personal error and ensure the construction quality, thus realizing a closed loop of detecting, analyzing, decision-making and controlling. The system is suitable for construction scenarios of hard rock tunnels in all weather, dangerous areas, depopulated zones or extreme conditions. It can adapt to different wall rocks, different machine diameters, different machine performances and different stages of the life cycle of the tunnel boring machine, so as to improve quality and efficiency of boring construction for a tunnel and an underground passage, and realize the intelligent control of the tunnel boring machine used in the rock tunnel and the underground passage in applications such as water-power engineering, railway and highway traffic engineering, and the refined management of the construction.

It should be noted that all of the above described features and advantages for the tunnel boring robot as described above are also applicable to the remote mobile terminal command system, which will not be elaborated in detail herein.

In addition, the technical features involved in the various embodiments described in the present disclosure may exist in any combination as long as they do not have opposite limitations.

Any process or method described in a flow chart or described herein in other ways may be understood to include one or more modules, segments or portions of codes of executable instructions for achieving specific logical functions or steps in the process, and the scope of an embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A tunnel boring robot, comprising:
a tunnel boring machine,
a sensing unit,
an intelligent decision unit connected to the sensing unit, and
a controller unit connected to the intelligent decision unit, wherein
the sensing unit, the intelligent decision unit and the controller unit are disposed at the tunnel boring machine,
the sensing unit is configured to sense, in real time, boring operation data of a current cycle during which the tunnel boring machine is working according to set boring parameter information, wherein the boring operation data comprises tunnel wall rock state information, tunnel geological forecasting information detected by a horizontal ultra-long drilling device, fine exploration information, precision lining information provided by a precision lining intelligent operation system, a real-time boring effect information indicator and real-time boring parameter information, wherein the wall rock state information comprises a uniaxial saturated compressive strength of rock $R_c(x, y, z)$, a joint number of unit volume of rock $J_v(x, y, z)$ and a wall rock grade $W(x, y, z)$, and the boring parameter information comprises a single-cutter thrust force $F_t(x, y, z)$, a single-cutter torque $T_n(x, y, z)$, a cutterhead rotational speed $N(x, y, z)$, a boring velocity $V(x, y, z)$ and a boring direction $D(x, y, z)$,
the intelligent decision unit is configured to receive the boring operation data sent by the sensing unit, and generate set boring parameter information for a next cycle according to a preset prediction algorithm, the boring operation data and a desired boring effect,
the controller unit is configured to receive the set boring parameter information for the next cycle, and control the tunnel boring machine to perform a boring operation for the next cycle according to the set boring parameter information for the next cycle.

2. The tunnel boring robot according to claim 1, wherein the sensing unit comprises:
an ahead geological detection subunit configured to perform a detection by the horizontal ultra-long drilling device to acquire the tunnel geological forecasting information.

3. The tunnel boring robot according to claim 1, wherein the preset prediction algorithm comprises a boring parameter prediction algorithm based on a neural network structure; and
the intelligent decision unit is further configured to generate the boring parameter prediction algorithm through training historical boring operation data.

4. The tunnel boring robot according to claim 1, wherein the controller unit comprises:
an electrical sub-controller unit comprising a plurality of programmable logic controller units (PLCs), the PLCs being communicated with each other through a network communication interface
wherein the electrical sub-controller unit is configured to control, respectively by the plurality of PLCs, a plurality of boring devices in the tunnel boring machine to perform a boring action according to the set boring parameter information.

5. The tunnel boring robot according to claim 4, wherein the electrical sub-controller unit comprises an A/D conversion function module, a PLC control program module, and a D/A conversion function module, wherein
the A/D conversion function module and the D/A conversion function module are both communicated with the PLC control program module, and
when the set boring parameter information comprises single-cutter thrust force,
the A/D conversion function module is configured to output, according to a voltage value corresponding to the single-cutter thrust force, a target thrust force value corresponding to the voltage value;
the PLC control program module is configured to acquire a current thrust force value according to a digital value and a thrust force position of an operation board, calculate a thrust force difference between the target thrust force value and the current thrust force value, and acquire a thrust force control digital value according to a preset algorithm and the thrust force difference;
the D/A conversion function module is configured to convert the thrust force control digital value into a thrust force control analog value;
the controller unit is specifically configured to control a hydraulic servo system and a hydraulic proportional valve that provide thrust force to the operation board according to the thrust control analog value, such that a thrust force of a single-cutter of the operation board reaches the target thrust force value.

6. The tunnel boring robot according to claim 1, wherein the sensing unit is specifically configured to:
collect N relative errors between boring direction design data and an actual boring direction measurement data of a guiding system of the tunnel boring machine with a first preset collection frequency in the current cycle, and calculate a first error average of the N relative errors, wherein N is any integer greater than 1;

collect N groups of the set boring parameter information and the real-time boring parameter information of the tunnel boring machine in the current cycle with a second preset collection frequency, and calculate a relative error for each parameter in each group of the set boring parameter information and the real-time boring parameter information, so as to acquire a set of errors;

calculate a second error average for each parameter with the N relative errors corresponding to the parameter in the set of errors;

perform a numerical average operation on the first error average value and the second error average value to obtain an average value $\overline{RE}$, and acquire the real-time boring effect information indicator according to the following formula, $$A(x,y,z)=100\times(1-\overline{RE})$$

wherein $A(x, y, z)$ represents the real-time boring effect information indicator.

7. The tunnel boring robot according to claim 1, wherein the intelligent decision unit is further configured to determine a boring mode according to the fine exploration information, and send the boring mode to the controller unit, such that the controller unit controls the tunnel boring machine to perform boring operation according to the boring mode;

the intelligent decision unit is further configured to generate disaster warning information according to the tunnel geological forecasting information, such that the tunnel boring machine adopts a disaster avoiding action according to the disaster warning information.

8. The tunnel boring robot according to claim 1, wherein training data for the preset prediction algorithm comprises the uniaxial saturated compressive strength of rock $R_c(x, y, z)$, the joint number of unit volume of rock $J_v(x, y, z)$, the wall rock grade $W(x, y, z)$, the single-cutter thrust force $F_t(x, y, z)$, the single-cutter torque $T_n(x, y, z)$, the cutterhead rotational speed $N(x, y, z)$, the boring velocity $V(x, y, z)$, the boring direction $D(x, y, z)$ and the boring effect information indicator $A(x, y, z)$.

9. The tunnel boring robot according to claim 8, wherein data characteristics of the $i^{th}$ boring cycle in a three-dimensional coordinates $(x, y, z)$ are as follows, $$x_n(x, y, z) = \begin{bmatrix} x \\ y \\ z \\ R_c^i(x, y, z) \\ R_c^{i-1}(x, y, z) \\ J_v^{i-1}(x, y, z) \\ J_v^i(x, y, z) \\ W^{i-1}(x, y, z) \\ W^i(x, y, z) \\ F_t^{i-1}(x, y, z) \\ F_t^i(x, y, z) \\ T_n^{i-1}(x, y, z) \\ T_n^i(x, y, z) \\ D^{i-1}(x, y, z) \\ D^i(x, y, z) \\ N^{i-1}(x, y, z) \\ N^i(x, y, z) \\ V^{i-1}(x, y, z) \\ V^i(x, y, z) \\ A^{i-1}(x, y, z) \\ A^i(x, y, z) \end{bmatrix}$$

5 latest boring cycles is selected to form a characteristic matrix:

$$X_i(x,y,z)=[x_i, x_{i-1}, x_{i-2}, x_{i-3}, x_{i-4}],$$

where $X_i(x, y, z)$ is a 21*5 two-dimensional matrix, $$X_i(x, y, z) = \begin{bmatrix} x & x & x & x & x \\ y & y & y & y & y \\ z & z & z & z & z \\ R_c^i(x, y, z) & R_c^{i-1}(x, y, z) & R_c^{i-2}(x, y, z) & R_c^{i-3}(x, y, z) & R_c^{i-4}(x, y, z) \\ R_c^{i-1}(x, y, z) & R_c^{i-2}(x, y, z) & R_c^{i-3}(x, y, z) & R_c^{i-4}(x, y, z) & R_c^{i-5}(x, y, z) \\ J_v^i(x, y, z) & J_v^{i-1}(x, y, z) & J_v^{i-2}(x, y, z) & J_v^{i-3}(x, y, z) & J_v^{i-4}(x, y, z) \\ J_v^{i-1}(x, y, z) & J_v^{i-2}(x, y, z) & J_v^{i-3}(x, y, z) & J_v^{i-4}(x, y, z) & J_v^{i-5}(x, y, z) \\ W^i(x, y, z) & W^{i-1}(x, y, z) & W^{i-2}(x, y, z) & W^{i-3}(x, y, z) & W^{i-4}(x, y, z) \\ W^{i-1}(x, y, z) & W^{i-2}(x, y, z) & W^{i-3}(x, y, z) & W^{i-4}(x, y, z) & W^{i-5}(x, y, z) \\ F_t^i(x, y, z) & F_t^{i-1}(x, y, z) & F_t^{i-2}(x, y, z) & F_t^{i-3}(x, y, z) & F_t^{i-4}(x, y, z) \\ F_t^{i-1}(x, y, z) & F_t^{i-2}(x, y, z) & F_t^{i-3}(x, y, z) & F_t^{i-4}(x, y, z) & F_t^{i-5}(x, y, z) \\ T_n^i(x, y, z) & T_n^{i-1}(x, y, z) & T_n^{i-2}(x, y, z) & T_n^{i-3}(x, y, z) & T_n^{i-4}(x, y, z) \\ T_n^{i-1}(x, y, z) & T_n^{i-2}(x, y, z) & T_n^{i-3}(x, y, z) & T_n^{i-4}(x, y, z) & T_n^{i-5}(x, y, z) \\ D^i(x, y, z) & D^{i-1}(x, y, z) & D^{i-2}(x, y, z) & D^{i-3}(x, y, z) & D^{i-4}(x, y, z) \\ D^{i-1}(x, y, z) & D^{i-2}(x, y, z) & D^{i-3}(x, y, z) & D^{i-4}(x, y, z) & D^{i-5}(x, y, z) \\ N^i(x, y, z) & N^{i-1}(x, y, z) & N^{i-2}(x, y, z) & N^{i-3}(x, y, z) & N^{i-4}(x, y, z) \\ N^{i-1}(x, y, z) & N^{i-2}(x, y, z) & N^{i-3}(x, y, z) & N^{i-4}(x, y, z) & N^{i-5}(x, y, z) \\ V^i(x, y, z) & V^{i-1}(x, y, z) & V^{i-2}(x, y, z) & V^{i-3}(x, y, z) & V^{i-4}(x, y, z) \\ V^{i-1}(x, y, z) & V^{i-2}(x, y, z) & V^{i-3}(x, y, z) & V^{i-4}(x, y, z) & V^{i-5}(x, y, z) \\ A^i(x, y, z) & A^{i-1}(x, y, z) & A^{i-2}(x, y, z) & A^{i-3}(x, y, z) & A^{i-4}(x, y, z) \\ A^{i-1}(x, y, z) & A^{i-2}(x, y, z) & A^{i-3}(x, y, z) & A^{i-4}(x, y, z) & A^{i-5}(x, y, z) \end{bmatrix}_{21*5}$$

constituting the training data for the preset prediction algorithm.

10. A remote mobile terminal command system, comprising a tunnel boring robot and a command apparatus, wherein
the tunnel boring robot is communicated with the command apparatus, and comprises:
a tunnel boring machine,
a sensing unit,
an intelligent decision unit connected to the sensing unit, and
a controller unit connected to the intelligent decision unit, wherein
the sensing unit, the intelligent decision unit and the controller unit are disposed at the tunnel boring machine,
the sensing unit is configured to sense, in real time, boring operation data of a current cycle during which the tunnel boring machine is working according to set boring parameter information, wherein the boring operation data comprises tunnel wall rock state information, tunnel geological forecasting information detected by a horizontal ultra-long drilling device, fine exploration information, precision lining information provided by a precision lining intelligent operation system, a real-time boring effect information indicator and real-time boring parameter information, wherein the wall rock state information comprises a uniaxial saturated compressive strength of rock $R_c(x, y, z)$, a joint number of unit volume of rock $J_v(x, y, z)$ and a wall rock grade $W(x, y, z)$, and the boring parameter information comprises a single-cutter thrust force $F_r(x, y, z)$, a single-cutter torque $T_n(x, y, z)$, a cutterhead rotational speed $N(x, y, z)$, a boring velocity $V(x, y, z)$ and a boring direction $D(x, y, z)$,
the intelligent decision unit is configured to receive the boring operation data sent by the sensing unit, and generate set boring parameter information for a next cycle according to a preset prediction algorithm, the boring operation data and a desired boring effect,
the controller unit is configured to receive the set boring parameter information for the next cycle, and control the tunnel boring machine to perform a boring operation for the next cycle according to the set boring parameter information for the next cycle;
the command apparatus comprises a mobile terminal and a cloud service unit, wherein
the cloud service unit is configured to:
monitor a tunnel construction site in real time,
Store, analyze, display, playback and manage boring operation data of the tunnel construction site transmitted by wireless,
support a man-machine interaction through the command system and the tunnel boring machine so as to realize a boring mode of remotely controlling the tunnel boring machine to work,
update a decision model of the intelligent decision unit,
provide an operation plan of the command apparatus to the intelligent decision unit, and
provide a real-time support to the intelligent decision unit; and
the mobile terminal is configured to:
allow a self-developed command system application to be loaded to access the cloud service unit of a cloud server in real time for man-machine interaction,
remotely control the tunnelling machine, and
remotely monitor the tunnel construction site in real time.

11. The remote mobile terminal command system according to claim 10, wherein
the mobile terminal is further configured to receive a boring operation instruction, and send the boring operation instruction to the tunnel boring robot to control the tunnel boring robot to perform a boring operation according to the boring operation instruction.

12. The remote mobile terminal command system according to claim 10, wherein the sensing unit comprises:
an ahead geological detection subunit configured to perform a detection by the horizontal ultra-long drilling device to acquire the tunnel geological forecasting information.

13. The remote mobile terminal command system according to claim 10, wherein the preset prediction algorithm comprises a boring parameter prediction algorithm based on a neural network structure; and
the intelligent decision unit is further configured to generate the boring parameter prediction algorithm through training historical boring operation data.

14. The remote mobile terminal command system according to claim 10, wherein the controller unit comprises:
an electrical sub-controller unit comprising a plurality of programmable logic controller units (PLCs), the PLCs being communicated with each other through a network communication interface
wherein the electrical sub-controller unit is configured to control, respectively by the plurality of PLCs, a plurality of boring devices in the tunnel boring machine to perform a boring action according to the set boring parameter information.

15. The remote mobile terminal command system according to claim 14, wherein the electrical sub-controller unit comprises an A/D conversion function module, a PLC control program module, and a D/A conversion function module, wherein
the A/D conversion function module and the D/A conversion function module are both communicated with the PLC control program module, and
when the set boring parameter information comprises single-cutter thrust force,
the A/D conversion function module is configured to output, according to a voltage value corresponding to the single-cutter thrust force, a target thrust force value corresponding to the voltage value;
the PLC control program module is configured to acquire a current thrust force value according to a digital value and a thrust force position of an operation board, calculate a thrust force difference between the target thrust force value and the current thrust force value, and acquire a thrust force control digital value according to a preset algorithm and the thrust force difference;
the D/A conversion function module is configured to convert the thrust force control digital value into a thrust force control analog value;
the controller unit is specifically configured to control a hydraulic servo system and a hydraulic proportional valve that provide thrust force to the operation board according to the thrust control analog value, such that a thrust force of a single-cutter of the operation board reaches the target thrust force value.

16. The remote mobile terminal command system according to claim 10, wherein the sensing unit is specifically configured to:
collect N relative errors between boring direction design data and an actual boring direction measurement data of a guiding system of the tunnel boring machine with a first preset collection frequency in the current cycle, and calculate a first error average of the N relative errors, wherein N is any integer greater than 1;
collect N groups of the set boring parameter information and the real-time boring parameter information of the tunnel boring machine in the current cycle with a second preset collection frequency, and calculate a relative error for each parameter in each group of the set boring parameter information and the real-time boring parameter information, so as to acquire a set of errors;

calculate a second error average for each parameter with the N relative errors corresponding to the parameter in the set of errors;

perform a numerical average operation on the first error average value and the second error average value to obtain an average value $\overline{RE}$, and acquire the real-time boring effect information indicator according to the following formula, $$A(x,y,z)=100-(1-\overline{RE})$$

wherein $A(x, y, z)$ represents the real-time boring effect information indicator.

17. The remote mobile terminal command system according to claim 10, wherein the intelligent decision unit is further configured to determine a boring mode according to the fine exploration information, and send the boring mode to the controller unit, such that the controller unit controls the tunnel boring machine to perform boring operation according to the boring mode;

the intelligent decision unit is further configured to generate disaster warning information according to the tunnel geological forecasting information, such that the tunnel boring machine adopts a disaster avoiding action according to the disaster warning information.

* * * * *